2,977,204

METHOD OF IMPROVING CORROSION RESISTANCE OF ZIRCONIUM

Donald W. Shannon, Richland, Wash., assignor to the United States of America as represented by the United States Atomic Energy Commission No Drawing. Filed Aug. 14, 1959, Ser. No. 833,893

3 Claims. (Cl. 41—42)

The invention relates to a method for improving the corrosion resistance of zirconium metal and its alloys, particularly resistance to corrosion by pressurized superheated water and steam such as is encountered in nuclear reactors of the pressurized type.

One of the chief problems of the nuclear reactor art is the confinement of the fissionable fuel elements within protective metal cladding or "cans," in order to prevent the escape of the fission and transmutation products into the coolant liquid or gas, thereby making the entire circulation system of the reactor dangerously radioactive. To do this, a metal of good mechanical strength and corrosion resistance is required, as well as one having a sufficiently small neutron absorption cross-section as not to inhibit the nuclear reaction. The last named requirement rules out most of the common metals for thermal nuclear reactors, and of those that remain, zirconium is among the most promising. Its thermal neutron absorption cross-section of 0.18 barns is exceptionally low; its mechanical strength is outstanding, and only its corrosion resistance fails in some cases to fulfill the requirements for reactor use.

To a limited extent the corrodibility of zirconium is reduced by adding minor amounts of other metals to make alloys such as Zircaloy-2, which consists essentially of 1.5% tin, 0.12% iron, 0.10% chromium, 0.05% nickel, all by weight, and the balance zirconium. Such alloying, however, does not solve wholly the corrosion problem to which the present invention is addressed and, moreover, the composition of such alloys is immaterial so far as the invention is concerned since it is operative whether the zirconium is alloyed or in pure form. For this reason, throughout this application, the term zirconium should be taken to refer to either the metal alone or to its alloys, unless the sense obviously requires otherwise.

In reactors of the pressurized type the coolant water and steam goes to temperatures far above the normal boiling point, as high as 250° C. and even higher. At such temperatures water has a dissociation constant of around 11.3 as compared to the ordinary room temperature dissociation constant of 14, and therefore its chemical character is comparable to a dilute acid with a pH of about 5.6, in addition to the usual thermodynamic effects brought about by such an elevation of temperature. After runs in reactors of this kind it was found that the zirconium cans and other shapes were covered for the most part with a tightly adherent dark colored film of $ZrO_2$ which fully protected the metal from further corrosion, but that in certain places the film was broken by gray-to-white splotchy corrosion. This gray-to-white corrosion is a non-adherent, non-protective type of $ZrO_2$ and occurs in places on the metal surface which have been damaged by sanding, vapor-blasting, machining or some other kind of mechanical working, where the surface has been contaminated by such things as fingerprints, chemical staining, welding slag, welding oxide, salt deposits from tap water and iron and copper residues from fuel element fabrication and the like. Much of this corrosion was eliminated when an etching procedure was adopted; the etching solution found to be effective for the purpose was a solution of nitric and hydrofluoric acids, usually about 39% by volume of 70% nitric acid, and 4% by volume of 48% hydrofluoric acid, the balance being deionized water. Ammonium fluoride solution is also a suitable etching solution. The zirconium cans and other shapes were immersed in this solution for about 4 to 5 minutes with agitation, or until from 1 to 2 mils of metal had been removed, and then taken from the solution and rinsed.

While the etching procedure was successful in eliminating most cases of the gray-to-white corrosion, another type of lighter colored, white corrosion appeared on the surfaces of the zirconium shapes after the etching, especially in crevices and other out-of-the-way places after they had been subjected to autoclaving. This type of white corrosion is known as acid staining. Numerous expedients were tried to overcome this, but none were found completely satisfactory; rinsing with tap water alone sometimes caused stains and seemed to do more harm than good. Rinsing with deionized water, if sufficiently prolonged, was effective, but when it came to doing this on a large scale, the cost became prohibitive; the deionized water quickly ceased to be completely deionized and the quantities needed to maintain the state of deionization became too great to give this method serious consideration.

It is, accordingly, an object of this invention to devise a method whereby acid staining of zirconium may be eliminated.

It is a further object of this invention to devise an improvement of the presently known methods of etching zirconium metal shapes.

It is a more particular object of the invention to devise an effective, economical method of rinsing zirconium metal shapes after they have been etched in a solution of nitric and hydrofluoric acids.

It is a more particular object of the invention to devise a method of rinsing such shapes after such etching without the need for prolonged contact with completely deionized water.

My invention is based on the discovery that the white acid staining on zirconium metal shapes is due to the presence of fluoride ions which give rise to a series of compounds which adhere to the surface and inhibit the formation of the protective dark colored film of $ZrO_2$, and that they may be easily and economically removed by rinsing the shapes in an acidic solution of a complexing agent and then rinsing with water, which may be ordinary tap water. I have had especially good results when the complexing agent is selected from the class consisting of aluminum salts and zirconium salts. It has been suggested that when the zirconium is withdrawn from the etching, or as it is also called, the pickling bath, the film of solution on the metal surface contains $HNO_3$, HF and $ZrF_6^{-2}$. The HF, according to this explanation, continues to build up more $ZrF_6^{-2}$, and as the water evaporates and the oxygen of thze air comes into contact with the surface, precipitation takes place in the form of $H_2ZrF_6$, $H_2ZrOF_4$ and $H_2ZrO_2F_2$. These compounds are partly, but difficultly, soluble, which may account for the fact that on open, accessible surfaces little or no acid staining is usually found if flowing tap water is used to rinse them away, but they are sufficiently insoluble that the limited quantities of tap water that are able to penetrate the crevices and other out-of-the-way places are insufficient to dissolve them, and they are either precipitated as insoluble calcium salts from the tap water, or when heated in a reactor or an autoclave, they are converted into the insoluble $ZrOF_2$. On the other hand, when my improvement of an intermediate acid complexing agent rinse is used, a soluble complex is formed with the fluoride ion; for example, with an aluminum salt the $Al^{+3}$ forms a very stable complex with the fluoride ion $(AlF_6)^{---}$, the salts of which are soluble so that the limited quantities of tap water that are able to penetrate the crevices are sufficient to dissolve them and carry them away. While there is reason to believe this theoretical explanation to be correct, I do not wish to be bound by it; in any event I have found that an intermediate rinse of a complexing agent solution after the etching makes it possible for the water rinsing operation to be carried out with undeionized water such as ordinary "tap" water, without the need for a prohibitively expensive rinse with deionized water and without the need for constant renewal of the water as it picks up ions as the rinsing proceeds. Theoretically, of course, there would be no objection to using deionized water to do all the rinsing, but as a practical matter the cost is prohibitive not only because deionized water costs several times as much as tap water to begin with, but also because much greater quantities of it would be required if the state of deionization is to be maintained constant.

Quite a number of commonly known aluminum and zirconium salts such as chlorides, nitrates, etc., may be used to carry out my improvement step, and quite a number of commonly known mineral acids may be used to acidify the solution; I prefer, however, to use aluminum nitrate in a solution acidified by nitric acid. While the proportions of the intermediate rinse solution are not critical, I have had good results with, and I prefer, a solution of 15% by weight $Al(NO_3)_3 \cdot 9H_2O$, the balance deionized water, and then enough nitric acid added to make the pH of the solution from about 0 to 1. Restated in another way, my preferred solution is 0.4 Molal ±0.1 in

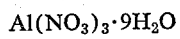
$$Al(NO_3)_3 \cdot 9H_2O$$

and 0.1 to 1.0 Normal in $HNO_3$. I have found that especially good results are attained when the acid aluminum salt solution is recirculated by pumping over the surfaces being treated; I prefer a recirculation at the rate of about 80 gal. per hour.

The chief advantage of my invention, as is explained above, is that it makes it possible to do the principal rinsing with ion-containing water such as ordinary tap water rather than with constantly renewed deionized water. Moreover, the tap water need not be constantly renewed but may be recirculated over the shapes for prolonged periods even though it acquires thereby quite a large amount of dissolved matter. I have found that spraying this kind of ion-containing water under pressure from nozzles gives unusually good results; I prefer a spray at the rate of 20 gal. per minute. This removes all the gross amounts of contaminants, the strong etching solution and the acid aluminum salt solution, but, of course, if the tap water that clings to the metal shapes were permitted to dry thereon, a certain amount of depositing would take place due to the fact that the tap water contains its original dissolved salts as well as the substances it has picked up during the recirculation referred to; it is therefore advisable to give the shape a final rinse with deionized water. Such a rinse as this, of course, is not to be compared to rinsing the shapes with deionized water directly out of the etching bath; the amount of deionized water for this final rinse is only a small fraction of what would be required for a direct rinse since only comparatively small traces of impurities are involved and none are of a difficultly soluble, adherent character.

Fuel elements clad with zirconium prepared according to the process with my improvement have been tested under autoclave conditions for 72 hours in steam at 400° C. and found in most cases to be covered with a uniform black oxide film, entirely free from both the gray-to-white corrosion and the lighter colored acid staining.

An additional advantage of my invention is that when my improvement is used, the fuel elements, before being put to actual use in a reactor, may be autoclaved under the conditions mentioned in the last paragraph, and then if found to be uniformly covered with black oxide, they may be used in a reactor with the previous assurance that they are sound. In case an occasional element should show corrosion of either kind it need not be discarded but may be vapor-blasted to remove the staining and the oxide film, and the etching process, including my improvement, repeated until the undesirable corrosion is eliminated completely.

EXAMPLE

A 19 rod cluster for a nuclear reactor of the plutonium recycle type was disassembled into its individual fuel rods. The rods had a core of uranium dioxide clad with Zircaloy-2 of 30 mil wall thickness, approximately ½ inch in diameter and 8 feet long; after preliminary cleaning to remove all obvious dirt and grease such as crayon marks, the rods were etched and rinsed for reactor use in a facility consisting of four tanks, each 12 inches wide and 10 feet long and holding about 20 gallons. The first tank contained an etching or pickling bath of 39% by volume of 70% concentrated $HNO_3$ (technical grade), 4% by volume 48% HF (technical grade) and 57% by volume of deionized water, at a temperature of 30° to 35° C. The fuel element rods were placed in this tank for four minutes during which a pump was run continuously to provide agitation by recirculating the tank charge at least four times an hour. Removal of the rods was then made within 60 seconds to the second tank which contained a solution of 15% by weight of

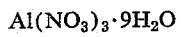
$$Al(NO_3)_3 \cdot 9H_2O$$

and a pH adjusted to zero by means of nitric acid, at 30° to 40° C., which was recirculated by a pump at the rate of 10 tank charges per hour. After five minutes the rods were removed within 60 seconds to the third tank which was equipped with spray nozzles and sprayed the cluster with tap water for five minutes at the rate of one tank charge per minute. Removal was then made, within 60 seconds, to the fourth tank containing deionized water of 100,000 ohms resistivity at 25° C. After five minutes in the fourth tank, the rods were wiped dry by clean cloths at a sufficient distance from the etch tank that gaseous HF was not present.

What is claimed is:

1. A method for improving the corrosion resistance of zirconium comprising immersing it in a first solution containing 39% by volume of 70% concentrated nitric acid, 4% by volume of 48% hydrofluoric acid and 57% by volume of deionized water; then rinsing it in a second solution containing 15% by weight of $Al(NO_3)_3 \cdot 9H_2O$ and 0.1 to 1.0 normal in nitric acid; then rinsing it in tap water and then rinsing it in deionized water.

2. A method for improving the corrosion resistance of zirconium comprising immersing it in a first solution containing 39% by volume of 70% concentrated nitric acid, 4% by volume of 48% hydrofluoric acid and 57% by volume of deionized water; then rinsing it in a second solution containing a soluble complexing agent for fluoride selected from the class consisting of aluminum nitrate, aluminum chloride, zirconium nitrate and zirconium chloride and of an acid strength of about 0.1 to 1.0 N; then rinsing it in tap water and then rinsing it in deionized water.

3. A method for improving the corrosion resistance of zirconium comprising immersing it in a first solution consisting essentially of fluoride ions and an acid of sufficient strength to cause etching; then rinsing it in a second solution consisting essentially of an inorganic complexing agent selected from the class consisting of aluminum nitrate, aluminum chloride, zirconium nitrate and zirconium chloride and an acid to give it an acid strength of about 0.1 to 1.0 N; then rinsing the zirconium in tap water and then rinsing it in deionized water.

(References on following page)

References Cited in the file of this patent

UNITED STATES PATENTS

| | | |
|---|---|---|
| 2,593,447 | Hesch | Apr. 22, 1952 |
| 2,614,913 | Reindl et al. | Oct. 21, 1952 |
| 2,719,079 | Murphy | Sept. 27, 1955 |
| 2,856,275 | Otto | Oct. 14, 1958 |
| 2,876,144 | Bomberger et al. | Mar. 3, 1959 |
| 2,879,186 | Fischer | Mar. 24, 1959 |
| 2,883,311 | Halpert | Apr. 21, 1959 |
| 2,887,373 | Winkler et al. | Mar. 19, 1959 |

FOREIGN PATENTS

| | | |
|---|---|---|
| 754,188 | Great Britain | Aug. 1, 1956 |

OTHER REFERENCES

The Chemical Behavior of Zirconium by Warren B. Blumenthal, D. Van Nostrand Co., Inc. 1958 (only pages 135–137 relied upon).